(12) United States Patent
Osaka et al.

(10) Patent No.: US 7,242,553 B2
(45) Date of Patent: Jul. 10, 2007

(54) SUBSTRATE FOR MAGNETIC RECORDING MEDIUM

(75) Inventors: Tetsuya Osaka, Tokyo (JP); Toru Asahi, Tokyo (JP); Tokihiko Yokoshima, Tokyo (JP); Toshihiro Tsumori, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 463 days.

(21) Appl. No.: 10/935,519

(22) Filed: Sep. 7, 2004

(65) Prior Publication Data

US 2005/0057855 A1    Mar. 17, 2005

(30) Foreign Application Priority Data

Sep. 12, 2003    (JP) ............................. 2003-322115

(51) Int. Cl.
*G11B 5/66*    (2006.01)
*G11B 5/70*    (2006.01)

(52) U.S. Cl. ...................................... 360/135; 428/831
(58) Field of Classification Search ............... 360/135; 428/831
See application file for complete search history.

(56) References Cited

U.S. PATENT DOCUMENTS

| | | | |
|---|---|---|---|
| 4,746,569 A * | 5/1988 | Takahashi et al. .......... 428/323 |
| 4,822,634 A * | 4/1989 | Takahashi et al. .......... 427/548 |
| 5,006,395 A * | 4/1991 | Hori et al. .................. 428/141 |
| 5,419,938 A * | 5/1995 | Kagotani et al. .......... 428/839.3 |
| 6,251,532 B1 * | 6/2001 | Futamoto et al. ............ 428/828 |
| 6,544,672 B1 * | 4/2003 | Futamoto et al. ............ 428/832 |
| 6,548,194 B2 * | 4/2003 | Hikosaka et al. .......... 428/836.1 |
| 6,627,301 B2 * | 9/2003 | Shimizu et al. .............. 428/212 |
| 6,818,331 B2 * | 11/2004 | Sakawaki et al. ......... 428/832.2 |
| 6,884,519 B2 * | 4/2005 | Shimizu et al. .............. 428/831 |
| 7,038,873 B2 * | 5/2006 | Shimazaki et al. ........... 360/59 |

FOREIGN PATENT DOCUMENTS

JP    5-143972    6/1993

* cited by examiner

*Primary Examiner*—Angel Castro
*Assistant Examiner*—Christopher R. Magee
(74) *Attorney, Agent, or Firm*—Myers Bigel Sibley & Sajovec, PA

(57) ABSTRACT

When a soft magnetic layer for a double layer type perpendicular magnetic recording medium is formed by a plating method, there is the problem of the occurrence of an isolated pulse noise called spike noise so that signal reproduction characteristics are lost. In order to solve this problem, provided are a surface-treated substrate for a magnetic recording medium comprising a substrate having a diameter of not more than 90 mm, and a soft magnetic plating layer comprising an alloy of at least two metals selected from the group consisting of Co, Ni and Fe, which is provided above the substrate, wherein the soft magnetic layer has a coercivity of less than 20 oersted (Oe) in a direction that is parallel to a substrate surface, and wherein a ratio of saturation magnetization to residual magnetization in a direction that is parallel to a surface of the substrate is from 4:1 to 4:3; and a magnetic recording medium comprising the magnetic recording medium substrate.

8 Claims, No Drawings

SUBSTRATE FOR MAGNETIC RECORDING MEDIUM

RELATED APPLICATION

This application claims priority from Japanese Patent Application No. 2003-32115, filed Sep. 12, 2003, the disclosure of which is incorporated by reference herein in its entirety.

BACKGROUND OF THE INVENTION

1. Field of the Invention

The present invention relates to a substrate for a magnetic recording medium and a magnetic recording medium which comprises a recording layer.

2. Description of the Related Art

In the field of magnetic recording, hard disk devices are indispensable as primary external recording devices of computers, for example personal computers, for recording information. Accompanying an increase in hard disk drive recording densities, development of perpendicular types of magnetic recording which allow a higher recording density is progressing, replacing conventional longitudinal magnetic recording methods.

In perpendicular magnetic recording, a magnetic field from an adjacent bit is in the same direction as the magnetizing direction, forming a closed magnetic circuit between the adjacent bits, and self-reducing magnetic field (referred to below as a "demagnetizing field") caused by its own magnetic field is less than in horizontal magnetic recording, stabilizing the magnetizing condition.

In perpendicular magnetic recording there is no particular necessity to make the magnetic film thin with increases in recording density. From these points, because perpendicular magnetic recording can reduce the demagnetizing field and secure the KuV values wherein Ku represents anisotropic energy, and particularly crystalline magnetic anisotropic energy in the case of magnetic recording, and V represents a unit recording bit volume, it has stability against magnetization by thermal fluctuations, and it can be said that this is a recording method that makes it possible to push the recording limit significantly upward. As recording media, perpendicular recording media have a high affinity with horizontal recording media, and it is possible to use basically the same technology as was used conventionally in both reading and writing of magnetic recording.

As for perpendicular magnetic recording media, there has been extensive investigation into double layered perpendicular magnetic recording media in which, in addition to a recording layer, a soft magnetic lining layer (typically permalloy or the like), a recording layer (for which candidate materials include CoCr-based alloy, a multi-layer film of alternating laminated layers of ultra thin films of PtCo layer and Pd and Co, and SmCo amorphous film), a protective layer and a lubricating layer are layered in this order on a substrate.

The double layered perpendicular magnetic recording medium has much better writing properties than a perpendicular magnetic recording medium having only a recording layer as a magnetic functional layer.

It is necessary that the lining layer of the double layered perpendicular magnetic recording medium is soft magnetic, and has a film thickness of at least 100 nm to about 500 nm. The soft magnetic lining layer is the conductive path not only for magnetic flux from the recording film above it, but also for the writing flux from the recording head. Because of this, it plays the same roll as an iron yoke in the magnetic circuit of a permanent magnet so that it has to be much thicker than the recording layer.

Compared to the formation of non-magnetic Cr-based primer film in a horizontal recording medium, the formation of the soft magnetic lining film of the double layered perpendicular recording medium is not simple. Ordinarily, the films constituting a horizontal recording medium are all formed by a dry process (principally by magnetron sputtering) (see Japanese Patent Application Unexamined Publication No. 5-143972/1993). Methods for forming not only the recording layer but also a soft magnetic layer by dry processing have been investigated for the double layered perpendicular recording medium as well. However, from the aspect of mass-production and productivity, there are large problems with forming soft magnetic layers by dry processing because of process stability, the complexity of parameter settings, and more than anything else, process speed. Furthermore, for the purpose of achieving higher densities, it is necessary to make the height at which the head floats above the surface of the magnetic disk, the flying height, as low as possible and in the manufacture of the double layered perpendicular magnetic recording medium, it is necessary to cover the substrate with a metal film of such a thickness that it can be leveled by grinding. However, because the adhesion of a thick film obtained by a dry process is low, leveling by grinding is very problematic. Thus, various tests were performed to cover a non-magnetic substrate with a metal film by a plating method, with which a thick film can be formed more easily than by vacuum deposition.

SUMMARY OF THE INVENTION

When a soft magnetic layer for a double layered type perpendicular magnetic recording medium is formed by a plating method, multiple magnetic domains are created. The magnetic domains are magnetized in a specific direction in a range of a few millimeters to a few centimeters on the plating film surface that constitutes the soft magnetic layer, and magnetic domain walls are generated at the boundaries of these magnetic domains. When a soft magnetic layer containing such magnetic domain walls is used in a double layer perpendicular magnetic recording medium, there is the problem of a large deterioration of signal reproduction characteristics caused by the generation of isolated pulse noise known as spike noise, caused through leaking magnetic fields generated by the magnetic domain wall portion.

In order to obtain by a simple method a double layered perpendicular magnetic recording medium that has excellent properties, the inventors have thoroughly investigated conditions for forming soft magnetic layers by plating methods, and the types of soft magnetic layers that are applicable.

As a result, it is found that when a soft magnetic layer is formed on or above a substrate for a recording medium through electroless plating, using an alloy of at least two metals selected from the group consisting of Co, Ni and Fe, the soft magnetic layer is selected to have a coercivity of less than 20 oersted (Oe) in a direction that is parallel to a substrate surface and to produce a ratio of saturation magnetization to residual magnetization in a direction that is parallel to the substrate surface is from 4:1 to 4:3, so that such soft magnetic layer is exceedingly effective in deterring the generation of spike noise and the magnetic domain walls which cause the spike noise.

Furthermore, it is found that when such a plating layer has a ratio of saturation magnetization to residual magnetization in a direction that is perpendicular to the substrate face, of 10000:1 to 100:1, the generation of the magnetic domain walls is suppressed even more, which is extremely desirable.

Moreover, a thorough investigation of the plating conditions for obtaining such a soft magnetic film was performed, and it is found that it is preferable that the substrate to be plated rotates or revolves so that the ratio of the plating film forming speed on or above the substrate to the plating solution speed above the substrate surface is from at least $1:3\times10^6$ to less than $1:2\times10^8$.

That is to say, the invention provides a surface-treated substrate for a magnetic recording medium, comprising a substrate having a diameter of not more than 90 mm; and a soft magnetic plating layer of an alloy comprising at least two metals selected from the group consisting of Co, Ni and Fe, which is provided on or above the substrate; wherein the soft magnetic layer has coercivity of less than 20 oersted (Oe) in a direction that is parallel to a substrate surface, and wherein a ratio of saturation magnetization to residual magnetization in a direction that is parallel to the substrate surface is from 4:1 to 4:3.

Furthermore, the invention provides a method for manufacturing a surface-treated substrate for a magnetic recording medium comprising a step of electroless plating for forming a soft magnetic film of an alloy comprising at least two metals selected from the group consisting of Co, Ni and Fe on or above a substrate having a diameter of not more than 90 mm, wherein the plating comprising coating the substrate which is rotating or revolving during plating so that the ratio of plating film forming speed on or above the substrate to the plating solution speed above the substrate surface to be plated is from at least $1:3\times10^6$ to less than $1:2\times10^8$ and the plating film forming speed is from at least 0.03 μm/min to less than 0.3 μm/min.

Furthermore, the invention provides a magnetic recording medium comprising the magnetic recording medium substrate.

The surface-treated substrate for a magnetic recording medium which has been subjected to the soft magnetic plating according to the invention has a very low occurrence of magnetic domain walls on its surface, and excellent spike noise characteristics. When the surface-treated substrate is used for a perpendicular magnetic recording device, excellent noise characteristics, that is, high recording densities can be obtained. In addition, according to the invention, the soft magnetic layer is formed by wet type electroless displacement plating so that the process is simpler and far more productive than the process for introducing a primer layer by vapor deposition or the like. Moreover, this process for manufacturing the soft magnetic layer can ensure smoothness by graining after plating, and the resulting magnetic recording medium has excellent characteristics.

Various aspects of the present invention will now be described in more detail with respect to other embodiments described herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

DETAILED DESCRIPTION OF THE PREFERRED EMBODIMENTS

There may be no particular limitation to the substrate used in the invention provided that the substrate is non-magnetic. It is possible to use a Si monocrystal substrate, glass substrates, or an aluminum substrate on which a Ni—P non-electrolyte plating has been provided, which is conventionally used in the manufacture of magnetic recording media.

The Si monocrystal substrate can be subjected to displacement plating. Because it has extremely uniform properties, it is particularly suited to accomplishing the object of the invention from the point of suppressing magnetic irregularities caused by plating irregularities.

The Si monocrystal used in the Si substrate may particularly preferably include a Si monocrystalline material manufactured by the CZ (Czochralski) process or the FZ (Floating Zone) method. The substrate may have any possible surface orientation, including for example (100), (110) and (111). Furthermore, the substrate-may contain a total amount of 0 to $10^{22}$ atoms/cm$^2$ of elements such as B, P, N, As, Sn and the like as impurities. However, when multicrystalline Si having different crystal orientations on the same substrate surface, and Si having extremely localized impurities are used as a substrate, the primer plating layer may be non-uniform because of differences in chemical reactivity. Moreover, when substrates having extreme segregation are used, the desirable primer plating layer structure may not be formed because a local battery is formed in the segregated portion of the substrate surface during primer film formation.

When Si is used as the substrate material of the invention, it is preferable to activate the substrate surface for primer plating layer formation in advance by etching slightly the surface oxide film and the substrate surface.

The etching can be carried out by various methods such as acid, alkali or electrolysis. With regard to etching conditions, when an aqueous solution of alkali such as caustic soda is used for etching, the substrate surface is etched at a concentration of 2 to 60 wt % at solution temperature of 30 to 100° C. for removing the surface oxide film and for corroding the substrate surface slightly.

Then, it is preferable to carry out displacement substitution plating for obtaining good adhesion, followed by electroless plating for obtaining the soft magnetic layer.

In displacement plating after the etching, a plating film may be formed by soaking the substrate in a plating solution containing ion or principal ion of one or more metals selected from the group consisting of Ag, Co, Cu, Ni, Pd and Pt at the concentration of at least 0.01 N and preferably of 0.05 to 0.3 N where the concentration is based on those of metal elements. Consequently, Si atoms at the substrate surface are substituted with metal atoms. There is no particular limitation on the method for displacement plating, and any plating method known in the art can be used.

The thickness of the displacement plating layer may be preferably 10 to 1000 nm, more preferably 50 to 500 nm. When layer is less than 10 nm thick, uniform distribution of the metal multi-crystalline particles may not be obtained. When it is over 1000 nm thick, the crystalline particles may swell and may not be suitable as a primer layer.

The major characteristic of the invention may lie in use of an electroless plating layer as the soft magnetic layer in the manufacture of the magnetic recording medium, wherein the soft magnetic layer has coercivity of less than 20 oersted (Oe), preferably 2 to 5 oersted (Oe) and has a ratio of saturation magnetization to residual magnetization being from 4:1 to 4:3 in a direction parallel to a substrate face. The soft magnetic layer may more preferably have the ratio of saturation magnetization to residual magnetization being from 100:1 to 10000:1 in a perpendicular direction to the substrate of the soft magnetic plating film.

The soft magnetic plating layer may be formed by a method of film formation generally known as electroless displacement plating.

In electrolytic plating, a sulfide or chloride bath can be used. Although various metals can be contained in the bath, metal salts containing two or more elements selected from Co, Ni and Fe are used so that an alloy plated layer containing two or more elements is formed. It is because the magnetic properties for a soft magnetic layer has to be achieved and it is necessary to obtain a cubic crystal.

Because Co, Ni and Fe can be used for electroless plating and have excellent properties as soft magnetic materials, there is a need to include these elements according to the invention.

According to the invention, because the magnetic properties are presumed to be caused by segregation of the principal metal component in extremely fine regions, there is a need for the alloy plating layer comprising at least two of these metal components. On the other hand, it is difficult to obtain the effect of the invention using a plated layer of a single metal.

A specific example of the bath (solution) composition may include a mixed bath of nickel sulfate and cobalt sulfate with a preferable concentration of 0.01 to 0.5 N.

A reducing agent usable in electroless plating may include hypophosphorous acid, dimethyl amine borane, and a compound selected based on the bath or the metal ions in the bath.

The plated soft magnetic layer that is required for the invention can be obtained by electroless plating of the substrate which is rotating or revolving in the plating liquid so that the ratio of a plating film formation speed on or above the substrate to a plating solution speed above the substrate surface to be plated is from $1:3\times10^6$ to less than $1:2\times10^8$, and is preferably from $1:8\times10^6$ to $1:1.5\times10^8$.

When the ratio of the plating film formation speed on the substrate to the plating solution speed of the substrate surface to be plated is less than $1:3\times10^6$, with regards to rotational frequency, the residual magnetization may become much larger than for a ratio of 4:3 of saturation magnetization to residual magnetization that is prescribed by the invention. When the ratio of the plating film formation speed on the substrate to the plating solution speed on the substrate surface to be plated is greater than $1:2\times10^8$, it is not preferable because the ratio of saturation magnetization to residual magnetization may become smaller than 4:1 as prescribed by the invention, and unevenness in the film formed by plating may be caused.

Just like the previously described ratio, the plating film forming speed itself is an important factor for embodying the invention. According to the invention, the plating speed may be at least 0.03 μm/min and less than 0.3 μm/min, and preferably at least 0.2 μm/min.

When the plating film forming speed is less than 0.03 μm/min, it is difficult to obtain a coercivity of less than 20 oersted (Oe) even if the composition or plating conditions are changed, and moreover, the residual magnetization may become too large so that the ratio of saturation magnetization to residual magnetization in the direction perpendicular to the substrate face may unpreferably exceed 4:3.

When the plating film forming speed exceeds 0.3 μm/min, then the residual magnetization may become too small due to the constituent crystal particles becoming amorphous, and the ratio of saturation magnetization to residual magnetization in the direction perpendicular to the substrate face may become smaller than the preferable ratio of 4:1.

A method for obtaining a predetermined plating solution flow speed may include a method of controlling solution recirculation during plating, a method of stirring the plating solution using an agitator such as a paddle, and a method of rotation and revolution of the substrate.

Of these, the method of revolution of the substrate is simple and effective for obtaining a predetermined solution flow speed. However, when the substrate is large, the substrate surface may be susceptible to eddy formation.

According to the invention, the substrate size is set to not more than 90 mm. When the substrate diameter is larger than 90 mm, it is difficult to form a uniform plating solution flow on the substrate face so that the effect of the invention is difficult to be obtained.

According to the invention, the plating film forming speed is defined as a thickness of growth of the plating film per unit time. The plating film cross section can be investigated by scanning electron microscope, fluorescent X-ray analysis or the like.

According to the invention, the plating solution speed is defined as the relative speed of the plating solution to the substrate in a direction parallel to the substrate face to be plated. In particular, it is the relative speed of the plating solution with comparison to the substrate in a region being less than 10 mm away from the substrate surface. It can be measured as a speed difference between the plating solution flow speed in said region and the movement of the substrate to be plated using a pitot tube, a vane-wheel type mass flow meter, an ultrasound flow meter or a laser-doppler flow meter.

In the region that is less than 1 mm away from the substrate to be plated, there is a stationary fluid layer of plating solution which moves in a state that is half fixed to the plating surface due to the viscosity of the fluid boundary film. According to the invention, however, the plating solution flow speed does not take into account the flow speed of the region directly adjacent to the substrate whose numerical measurement is difficult, like the region of the fluid boundary film.

According to the invention, the crystal structure of the soft magnetic layer having characteristics as prescribed are investigated through X-ray diffraction. The result shows a crystal arrangement of the soft magnetic layer is of an FCC or BCC cubic crystal structure, regardless of its composition. Comparing the intervals between the lattice faces of the portions that form the square faces of the crystal, when the lattice face interval perpendicular to the planar soft magnetic layer and the face interval parallel to the planar soft magnetic layer are compared, a difference is found in the lattice face intervals. The cubic lattice face that is perpendicular to the soft magnetic layer is longer by at least 0.3% and less than 3%. Furthermore, it is found that such difference in the lattice face interval is not dependent on orientation or arrangement of the crystals which constitute the soft magnetic layer, but is dependent on the angle with respect to the surface of the planar soft magnetic layer. The precise reason for this is unknown, but it is assumed that such an internal crystal structure is a factor in determining the magnetic characteristics of the soft magnetic layer of the invention.

The thickness of the soft magnetic layer may be preferably 100 to 1000 nm.

When the thickness exceeds 1000 nm, the magnetic noise from the soft magnetic layer of the medium during signal reproduction may become large and the S/N of the medium may lead to a reduction in characteristics. Thus, it is undesirable. When the thickness is less than 100 nm, the magnetic permeation characteristics may be insufficient as a soft magnetic primer layer and there may be a reduction in overwrite characteristics as a medium. Thus, it is undesirable.

After forming the soft magnetic layer of 100 nm to 1000 nm as noted above, the magnetic recording medium of the invention may be preferably produced by forming a magnetic recording layer of 5 to 100 nm, a protection layer of 2 to 20 nm and a lubrication layer in sequence on or above the soft magnetic layer.

The magnetic recording layer may be formed on or above the soft magnetic layer and may be a recording layer of a magnetically hard material for magnetic recording.

The magnetic recording layer can be formed directly on the soft magnetic layer, or it can be formed via one or more intermediate layers such as Ti, by which a crystal particle size and magnetic characteristics can be matched as necessary.

There may be no particular limitation to the material for the magnetic recording layer, as long as it is a highly magnetic material containing magnetic domains that are easily magnetized in a direction perpendicular to the planar layer. The magnetic recording layer may include a Co—Cr alloy film applied through sputtering, a Fe-Pt alloy film, a Co—Si granule film and a Co/Pd multi-layered film. In addition, a film formed by wet plating such as a Co—Ni-based plating film can be used as the recording film. Further, a film formed by coating such as barium ferrite film of a magnetoplumbite phase can be used as the recording layer.

The thickness of this recording layer may be generally 5 to 100 nm, more preferably 10 to 50 nm. Furthermore, with regard to coercivity, it may be preferable to provide a recording layer of 0.5 to 10 KOe, more preferably 1.5 to 3.5 KOe.

The protective layer that is formed on or above the magnetic recording layer may include an amorphous C-based protective film formed through sputtering or CVD, a protective film of crystalline such as $Al_2O_3$, and the like.

Furthermore, the lubricating film of the uppermost layer may include a monomolecular film through application of a fluorine-based oil. There may be no particular limitation to the type of agent or method of application.

The invention is explained below with an example. However, the invention is never construed to be limited to this.

EXAMPLE 1

A (100) Si monocrystal (P-doped N-type substrate) having a diameter of 65 mm was produced by coring, chamfering and lapping of a 200 mm diameter Si monocrystalline substrate fabricated by the CZ process. A surface roughness (Rms) of 4 nm was obtained by grinding both surfaces with colloidal silica having an average particle size of 15 nm. The Rms is a mean square roughness and was measured using an AFM (Atomic Force Microscope).

After removal of the thin oxide film from the substrate surface and Si etching on the substrate surface by soaking the substrate for 3 minutes in a 2% by weight aqueous caustic soda solution at 45° C., the substrate was soaked for 5 minutes in a bath heated to 80° C. wherein the bath was a primer plating bath (solution) produced by addition of 0.5 N ammonium sulfate into an aqueous solution of 0.1 N nickel sulfate. Consequently, the primer plating layer is formed on the substrate.

Then, a plating bath (solution) containing 0.2 N ammonium sulfate, 0.02 N nickel sulfate, 0.1 N cobalt sulfate, 0.01 N iron sulfate, and 0.04 N dimethyl amine borane as a reducing agent was prepared. The bathe was heated to 65° C. so that the film growth speed of the electroless plating on the substrate was 0.1 μm/min.

The substrate to be plated was rotated at high speed of 60 rpm in the plating solution, while electroless plating was performed for 20 min, yielding a soft magnetic layer having a thickness of 2 μm.

During this time, the plating solution speed at a position 5 mm away from the substrate surface was measured by a laser doppler flow speed meter. The speed was 3,000 mm/min with respect to the substrate at the inner circumferential edge of the substrate being 10 mm away from the center of the substrate, while the speed was 10,000 mm/min with respect to the substrate at the outer circumferential edge of the substrate being 32.5 mm away from the center of the substrate. The ratios of the plating film forming speed to the plating solution flow speed above the substrate surface to be plated were $1:3 \times 10^7$ and $1:10^8$.

When the magnetic characteristics of the soft magnetic film obtained in such a manner were measured with an oscillating type magnetometer, the coercivity in the direction parallel to the face of the soft magnetic layer was 4 oersted (Oe), the saturation magnetization was 18000 G, the residual magnetization was 9000 G, and the ratio of saturation magnetization to residual magnetization was 2:1.

When the magnetic characteristics were measured in a direction that is perpendicular to a face of the soft magnetic layer in a similar manner, the coercivity was 50 Oe, the saturation magnetization was 18000 G, the residual magnetization was 10 G, and the ratio of saturation magnetization to residual magnetization was 1800:1.

Moreover, when the crystals of the soft magnetic layer were observed by X-ray diffraction, the average interval of the lattice faces in a direction parallel to a film face constituted by a group of un-orientated FCC crystals was 2.024 Å, the average interval of cubic lattice faces in a direction perpendicular to the film face was 2.040 Å, and thus the lattice face interval in the direction perpendicular to the film face was 0.8% longer than the cubic lattice face interval in the direction parallel to the film face.

The substrate comprising such a soft magnetic layer was coated with a 20 nm thick perpendicular magnetic recording film containing Co, Cr and Ta in weight ratios of Co:Cr:Ta=79:19:2 by sputtering at a constant temperature of 220° C.

When the coercivity of the recording layer was measured, the coercivity in the direction perpendicular to the film face was 2.2 KOe, and the coercivity in the direction parallel to the film face was 500 oersted (Oe).

Moreover, the substrate was covered with amorphous carbon of a thickness of 10 nm, and then coated with a fluorine-based lubricating film by dipping. Consequently, a perpendicular magnetic recording medium was produced.

The medium thus obtained was installed on a spinstand and DC erasing was carried out. Then, the noise of the medium was measured with nanoslider GMR head at a floating height of 10 nm. As a result, no spike noise was observed in the reproduction envelope pattern.

Furthermore, for the purpose of investigating the state of magnetic migration, the Kerr effect was investigated across the entire substrate region with a magnetic sensor device (OSA5100, made by Candela Co., Ltd.). However, magnetic migration capable of causing spike noise from the soft magnetic layer was not observed.

The invention claimed is:

1. A surface-treated substrate for a magnetic recording medium, comprising:
    a substrate having a diameter of not more than 90 mm; and
    a soft magnetic plating layer comprising an alloy of at least two metals selected from the group consisting of Co, Ni and Fe, which is provided on or above the substrate;
    wherein the soft magnetic layer has a coercivity of less than 20 oersted (Oe) in a direction that is parallel to a substrate surface; and
    wherein a ratio of saturation magnetization to residual magnetization in a direction that is parallel to the substrate surface is from 4:1 to 4:3.

2. The surface-treated substrate for a magnetic recording medium according to claim 1, further comprising:
    a magnetic recording layer that is provided on or above said soft magnetic film plating layer.

3. The surface-treated substrate for a magnetic recording medium according to claim 1,
    wherein said soft magnetic plating layer has a ratio of saturation magnetization to residual magnetization of 100:1 to 10000:1 in a direction that is perpendicular to said substrate surface.

4. The surface-treated substrate for a magnetic recording medium according to claim 2,
    wherein said soft magnetic plating layer has a ratio of saturation magnetization to residual magnetization of 100:1 to 10000:1 in a direction that is perpendicular to said substrate surface.

5. A magnetic recording medium comprising the surface-treated substrate according to claim 1.

6. A magnetic recording medium comprising the surface-treated substrate according to claim 2.

7. A magnetic recording medium comprising the surface-treated substrate according to claim 3.

8. A magnetic recording medium comprising the surface-treated substrate according to claim 4.

* * * * *

UNITED STATES PATENT AND TRADEMARK OFFICE
CERTIFICATE OF CORRECTION

PATENT NO. : 7,242,553 B2  Page 1 of 1
APPLICATION NO. : 10/935519
DATED : July 10, 2007
INVENTOR(S) : Osaka et al.

It is certified that error appears in the above-identified patent and that said Letters Patent is hereby corrected as shown below:

On Title Page:

Item (73): Please correct to read as:
--Assignee: Waseda University and Shin-Etsu Chemical Co., Ltd., Tokyo (JP)--

Signed and Sealed this

Twenty-third Day of October, 2007

JON W. DUDAS
*Director of the United States Patent and Trademark Office*